(12) United States Patent
Yamagiwa

(10) Patent No.: US 7,715,355 B2
(45) Date of Patent: May 11, 2010

(54) BASE STATION MODULATOR/DEMODULATOR AND SEND/RECEIVE METHOD

(75) Inventor: Hirofumi Yamagiwa, Saitama (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 11/679,579

(22) Filed: Feb. 27, 2007

(65) Prior Publication Data

US 2007/0140201 A1 Jun. 21, 2007

Related U.S. Application Data

(63) Continuation of application No. 09/955,955, filed on Sep. 20, 2001, now Pat. No. 7,200,131.

(30) Foreign Application Priority Data

Sep. 20, 2000 (JP) ............... 2000-285538

(51) Int. Cl.
*H04Q 7/24* (2006.01)
(52) U.S. Cl. ............ 370/338; 370/310; 370/310.2; 370/328; 370/349; 370/395.1
(58) Field of Classification Search ............ 370/310, 370/310.1, 310.2, 328, 338, 349, 395.1
See application file for complete search history.

(56) References Cited

U.S. PATENT DOCUMENTS

| | | | | |
|---|---|---|---|---|
| 5,323,389 | A * | 6/1994 | Bitz et al. | 370/397 |
| 5,408,461 | A * | 4/1995 | Uriu et al. | 370/248 |
| 5,440,547 | A * | 8/1995 | Easki et al. | 370/395.3 |
| 5,467,349 | A * | 11/1995 | Huey et al. | 370/397 |
| 5,490,140 | A | 2/1996 | Abensour et al. | 370/352 |
| 5,506,847 | A * | 4/1996 | Shobatake | 370/338 |
| 5,598,402 | A | 1/1997 | Mizusawa et al. | 370/225 |
| 5,633,868 | A | 5/1997 | Baldwin et al. | 370/331 |
| 5,717,689 | A * | 2/1998 | Ayanoglu | 370/349 |
| 5,727,051 | A * | 3/1998 | Holender | 379/112.05 |
| 5,771,231 | A * | 6/1998 | Watanabe | 370/377 |
| 5,777,994 | A * | 7/1998 | Takihiro et al. | 370/395.53 |
| 5,793,767 | A * | 8/1998 | Soda et al. | 370/397 |

(Continued)

FOREIGN PATENT DOCUMENTS

JP 9-298545 11/1997

(Continued)

*Primary Examiner*—Ayaz R Sheikh
*Assistant Examiner*—Andrew C Lee
(74) *Attorney, Agent, or Firm*—Harrity & Harrity, LLP

(57) ABSTRACT

A base station, in a mobile communication network, includes a receive component to receive, from a higher rank station in the network, a particular data unit that includes multiple data units multiplexed together; a master processor to determine that the first portion of the particular data unit is destined for the base station and that the second portion of the particular data unit is not destined for the base station, and discard the second portion of the particular data unit; and a slave processor to determine that the second portion of the particular data unit is destined for the other base station and that the first portion of the particular data unit is not destined for the other base station, and send the second portion of the particular data unit to the other base station.

20 Claims, 11 Drawing Sheets

U.S. PATENT DOCUMENTS

| | | | |
|---|---|---|---|
| 5,809,501 A * | 9/1998 | Noven ............................ 707/7 |
| 5,835,710 A * | 11/1998 | Nagami et al. .............. 709/250 |
| 5,953,339 A * | 9/1999 | Baldwin et al. ............. 370/397 |
| 5,987,034 A * | 11/1999 | Simon et al. ................. 370/465 |
| 5,999,518 A * | 12/1999 | Nattkemper et al. ........ 370/258 |
| 6,031,838 A * | 2/2000 | Okabe et al. ............. 370/395.6 |
| 6,108,336 A | 8/2000 | Duault et al. ............ 370/395.6 |
| 6,128,287 A | 10/2000 | Freeburg et al. ............ 370/331 |
| 6,172,991 B1 * | 1/2001 | Mori .......................... 370/474 |
| 6,175,567 B1 * | 1/2001 | Yoo ........................ 370/395.7 |
| 6,185,213 B1 * | 2/2001 | Katsube et al. ............. 370/397 |
| 6,246,679 B1 | 6/2001 | Yamamoto .................. 370/352 |
| 6,289,018 B1 | 9/2001 | Song ....................... 370/395.6 |
| 6,356,537 B1 | 3/2002 | Jaakkola et al. ........... 370/310.2 |
| 6,381,243 B1 * | 4/2002 | Ekstedt ................. 370/395.62 |
| 6,463,045 B1 * | 10/2002 | Fujimoto .................... 370/331 |
| 6,483,838 B1 * | 11/2002 | Ostman et al. ......... 370/395.31 |
| 6,490,264 B1 * | 12/2002 | Suzuki ....................... 370/338 |
| 6,504,833 B1 | 1/2003 | Ishii et al. ................... 370/342 |
| 6,574,221 B1 * | 6/2003 | Petersen ................. 370/395.1 |
| 6,640,248 B1 * | 10/2003 | Jorgensen ................... 709/226 |
| 6,643,524 B1 * | 11/2003 | Ishii et al. ................... 455/560 |
| 6,665,279 B1 | 12/2003 | Kwak et al. ................. 370/328 |
| 6,707,800 B1 * | 3/2004 | Peyrovian et al. ........ 370/310.1 |
| 6,731,627 B1 | 5/2004 | Gupta et al. ................. 370/352 |
| 6,731,640 B1 | 5/2004 | Perry et al. .............. 370/395.6 |
| 6,895,013 B1 | 5/2005 | Burns et al. ................. 370/401 |
| 6,944,138 B1 * | 9/2005 | Song ....................... 370/310.1 |
| 6,947,756 B2 * | 9/2005 | Khan et al. ............... 455/456.5 |
| 7,154,856 B1 * | 12/2006 | Ueno .......................... 370/242 |
| 7,203,198 B2 * | 4/2007 | Knight et al. .......... 370/395.54 |
| 2002/0181463 A1 * | 12/2002 | Knight ........................ 370/392 |
| 2003/0152108 A1 * | 8/2003 | Lee ............................. 370/474 |

FOREIGN PATENT DOCUMENTS

| | | |
|---|---|---|
| JP | 2897769 | 3/1999 |
| JP | 3003779 | 11/1999 |
| JP | 3037313 | 2/2000 |
| WO | WO 97/13380 | 4/1997 |
| WO | WO 00/18179 | 3/2000 |

* cited by examiner

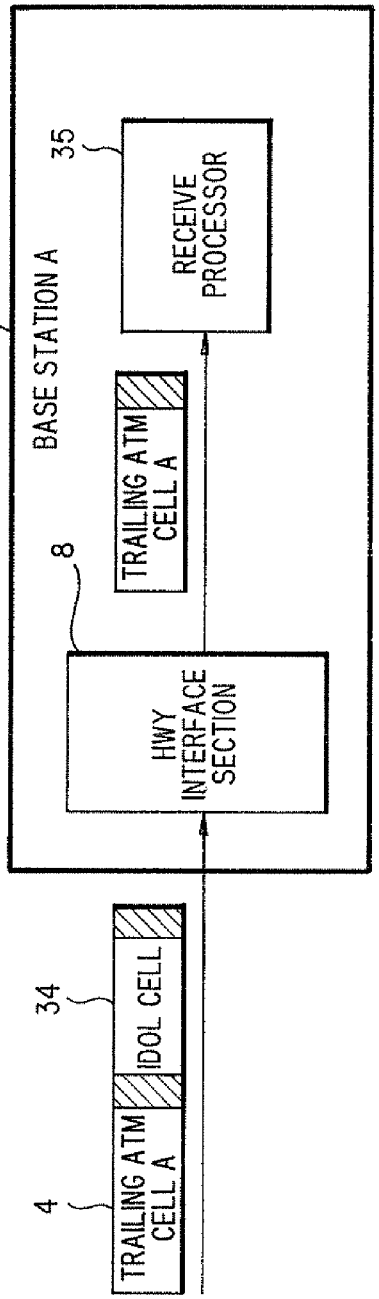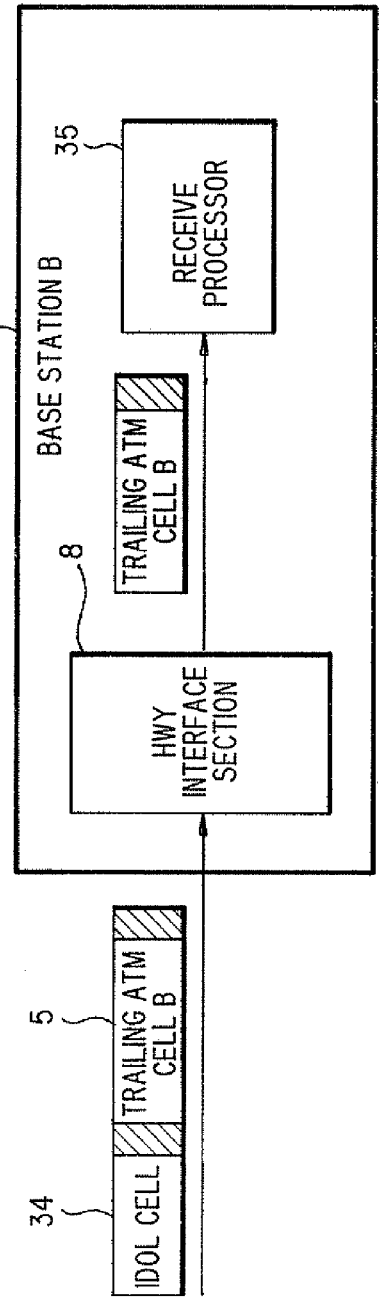

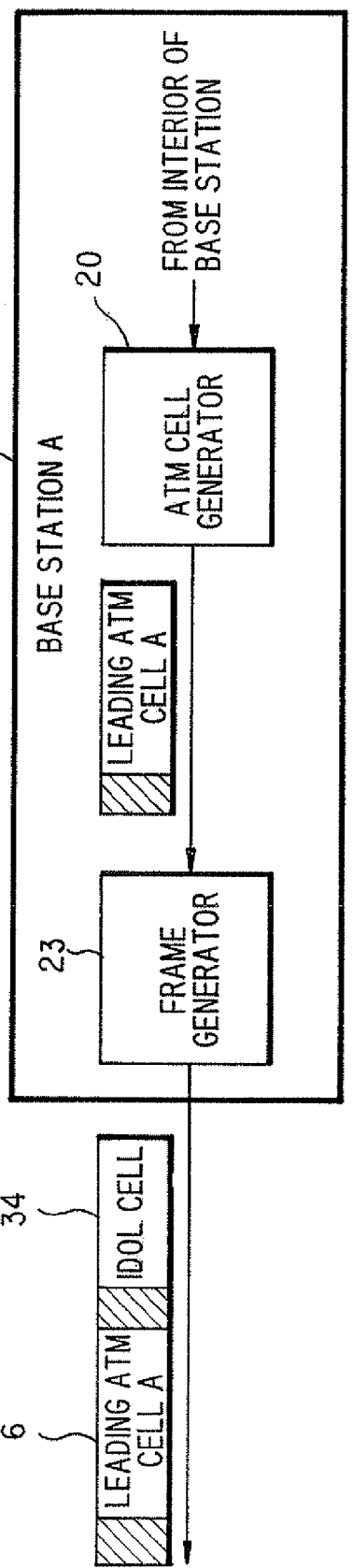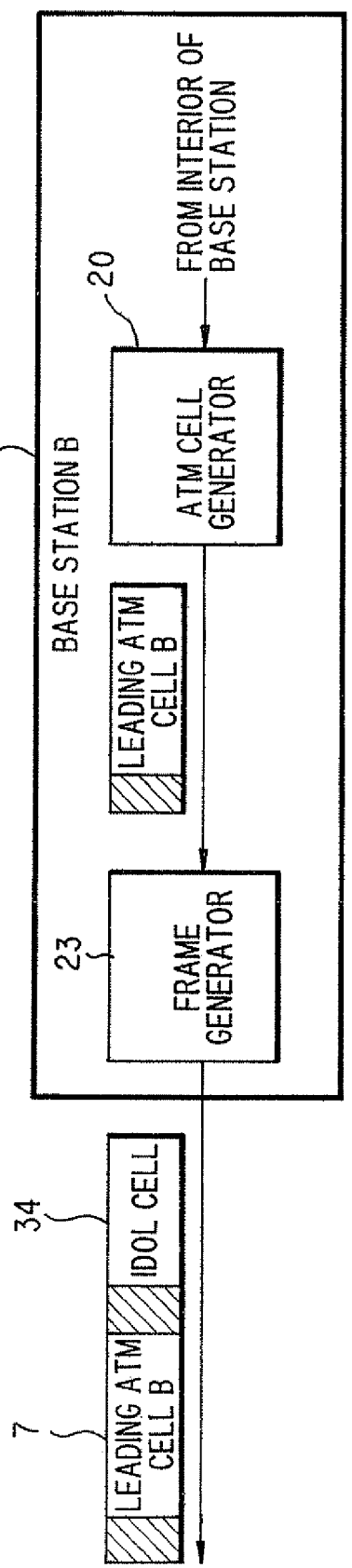

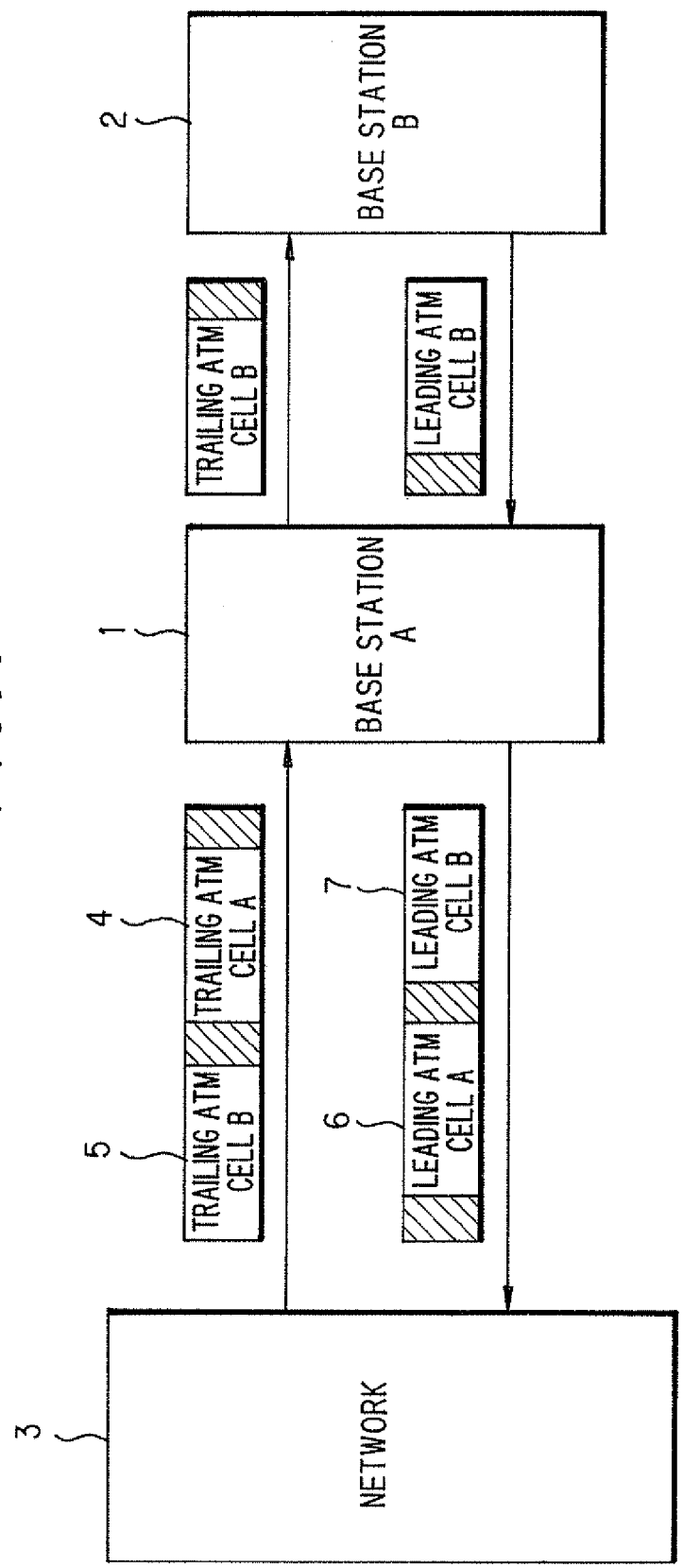

BASE STATION MODULATOR/DEMODULATOR AND SEND/RECEIVE METHOD

RELATED APPLICATION

This application is a continuation of U.S. patent application Ser. No. 09/955,955 filed Sep. 20, 2001, which is hereby incorporated by reference.

FIELD OF THE INVENTION

The invention relates to a base station modulator/demodulator and an ATM (asynchronous transfer mode) cell send/receive method utilizing an ATM line, and more particularly to a base station modulator/demodulator and an ATM cell send/receive method suitable for the elimination of the waste of a leased line at the time of send/receive of ATM cells.

BACKGROUND OF THE INVENTION

There is a conventional mobile communication system which performs send/receive of ATM cells utilizing an ATM line between a higher rank station and a base station.

FIG. 1 is a diagram showing an example of the construction of a conventional mobile communication system. In this mobile communication system, a base station A 1 and a base station B 2 are connected to a higher rank station through a network 3. The network 3 is connected to the base station through a leased line. Trailing data from the higher rank station is sent to the base station A 1 through a leased line and to the base station B 2 through another leased line. Data received by the base station A is designated as trailing ATM cell A 4, and data sent from the base station A to the higher rank station is designated as leading ATM cell A 6. Likewise, for the base station B, data received by the base station B is designated as trailing ATM cell B 5, and data sent from the base station B to the higher rank station is designated as leading ATM cell B 7.

FIG. 6 shows an ATM cell format. An ATM cell 25 is constituted by data of 53 bytes. In this case, 5 bytes from the head constitute an ATM header 26, and the remaining 48 bytes constitute a payload 27. The ATM header 26 comprises GFC (generic flow control) 28, VPI (virtual path identification) 29, VCI (virtual channel identification) 30, PT (payload type) 31, CLP (cell lose priority) 32, and HEC (header error control) 33.

GFC 28 is provided for flow control which is performed when traffic has been increased and, consequently, overload state has taken place over the network 3. VPI 29 is utilized in setting of a virtual path between the higher rank station and the base station, and VCI 30 is utilized for the identification of each of a plurality of data in the set VP (virtual path) in the communication of the plurality of data. PT 31 indicates the state of cell (congestion), and CLP 32 indicates the significance of cell. HEC 33 functions to detect bit error of the ATM header 26, and indicates the results of coding of 8-bit CRC for 4 bytes in the header except for HEC 33. A payload 27 indicates the storage region of communication data.

FIG. 7 is a diagram showing a leased line (a secondary group) frame format as one example of the leased line frame format. The secondary group of leased lines have a transmission capacity of 6.3 Mbps wherein 789 bits are arranged in a frame of time length 125 μs. In this format, 8 bit-length 98 TSs (time slots) can be obtained. In a portion of 96 TSs (96 bytes×8=768 bits) among them, ATM cells 25 are continuously arranged.

FIG. 2 shows an example of the construction of a conventional trailing ATM cell. The trailing ATM A 4 from the higher rank station is received in an HWY interface section 8 in the base station A 1. A receive processor 35 has the function of terminating the trailing ATM cell A 4. The base station A 1 and the base station B 2 are handled as devices which are independent of each other. Thus, these base stations have the same construction.

FIG. 3 shows an example of the construction of a conventional trailing processing function. This function will be explained by taking the base station A 1 as an example. For data received from the leased line, the physical layer is terminated in the HWY interface section 8. In a leased line frame trailer 11, the frame format shown in FIG. 7 is synchronized. After the establishment of the synchronization of the frame, cell synchronization for establishing the position of cell boundary is carried out in an ATM cell synchronous detector 12, for identifying an ATM cell 25 mapped within the frame format.

For the ATM cell 25 within the frame format which has been picked out in the ATM cell synchronous detector 12, error detection of HEC 33 is carried out in the ATM HEC error detector 22, and the ATM cell 25, which has been found to have an error, is discarded in this function. The trailing ATM cell A 4, which has been judged to be effective in the physical layer is sent to the receive processor 35. In the receive processor 35, VPI 29 is confirmed for the trailing ATM cell A 4 received by VPI filter 14, and only the trailing ATM cell A 4 having VPI 29 assigned to the base station A 1 is transferred to the next processing. The ATM cell 25, wherein VPI 29 is different from the set value, is discarded by this function.

The trailing ATM cell A 4, which has been passed through the filter of VPI 14, judges various ATM cells assigned by the VCI filter 15, and is terminated at an ATM cell trailer 16.

FIG. 4 shows an example of the construction of a conventional leading ATM cell. The leading ATM cell A 6 from the base station A is generated in an ATM cell generator 20. Since the base station. A 1 and the higher rank station are connected to each other through a leased line, the base station A 1 maps the leading ATM cell B 7 in the leased line (secondary group) frame format shown in FIG. 7 through the use of a frame generator 23. Further, there is also a function of mapping of an idol cell 34 in the frame format according to the transmission rate capacity of the leading ATM cell A 6.

Regarding another example of the conventional mobile communication system, for example, Japanese Patent No. 3003779 proposes a mobile communication system wherein the control link between an exchange and a radio base station is established using a control signal by ATM.

The above-described conventional prior art techniques, however, had the following problems.

The first problem is such that when reduction in size/reduction in capacity of the base station has lead to a reduction in quantity of data for communication between the base station and the higher rank station and, consequently, the quantity of data has become smaller than the capacity of the leased line, in the mapping within the leased line, the proportion of the effective cell becomes larger than the proportion of the idol cell. This creates wasteful line charge. When the number of users to be supported by the base station has been changed, for example, due to a reduction in size, changing the rate including the quantity of data in the cable to an optimal rate is preferred. Since, however, there is no leased line suitable for the capacity, the system of the base station should be constructed in such a state that an unused band exists.

The second problem is such that, in solving the first problem, the connection of the conventional model should be possible. That is, a system should be devised which has succeeded to the conventional system design and can utilize existing models.

SUMMARY OF THE INVENTION

Accordingly, it is an object of the invention to provide a base station modulator/demodulator and an ATM cell send/receive method, wherein, for a base station in which the band of ATM cell utilized between the base station and the higher rank station has been reduced due to a reduction in size/reduction in capacity, ATM cells corresponding to a plurality of base stations are logically multiplexed with the leased line between the base station and the higher rank station and the termination of the ATM cell addressed to itself in the master base station and the send of ATM cell to a slave base station and the receive of ATM cell from the slave base station can be simultaneously realized to enable the elimination of the waste of the leased line.

According to the first feature of the invention, a base station modulator/demodulator for constituting a mobile communication system and sending ATM cells to a higher rank station and receiving ATM cells from the higher rank station, comprises:

receive means for terminating, among ATM cells received from the higher rank station through a leased line, ATM cells addressed to the base station;

first send means for sending, among the ATM cells received from the higher rank station through the leased line, ATM cells addressed to another base station to the another base station; and second send means for multiplexing ATM cells of a plurality of base stations, said base station and said another base station, and sending the multiplexed cells to the higher rank station through the leased line.

According to the second feature of the invention, an ATM cell send/receive method in a mobile communication system for performing send/receive of ATM cells between a higher rank station and a base station, comprises the steps of:

terminating, among ATM cells received from the higher rank station through a leased line, ATM cells addressed to the base station;

sending, among the ATM cells received from the higher rank station through the leased line, ATM cells addressed to another base station to the another base station; and multiplexing ATM cells of a plurality of base stations, said base station and said another base station, and sending the multiplexed cells to the higher rank station through the leased line.

Referring now to FIGS. 8 and 9, the base station modulator/demodulator according to the invention is provided in a base station constituting a mobile communication system and sends ATM cells to a higher rank station and receives ATM cells from the higher rank station. The base station modulator/demodulator comprises: receive means (9) for terminating, among ATM cells received from the higher rank station through a leased line, ATM cells addressed to the base station; first send means (10) for sending, among the ATM cells received from the higher rank station through the leased line, ATM cells addressed to another base station to the another base station; and second send means (19) for multiplexing ATM cells of a plurality of base stations, the base station and the another base station, and sending the multiplexed cells to the higher rank station through the leased line.

According to the base station modulator/demodulator of the invention, for a base station wherein the usable band of the ATM cell between the base station and the higher rank station has been reduced due to a reductions in size/reduction in capacity of the base station, ATM cells of a plurality of base stations are logically multiplexed in a leased line between the base station and the higher rank station, the master base station terminates the ATM cell addressed thereto, and, at the same time, the send of ATM cell to a slave base station and the receive of ATM cell from the slave base station can be realized, whereby the waste of the leased line can be eliminated. Further, since the master base station and the slave base station have the same processing function, the thinking of "master/slave base station" is unnecessary and thus, this facilitates system design. Furthermore, since the master base station has the same processing function as the slave base station, a further slave base station can be easily provided under the slave base station.

BRIEF DESCRIPTION OF THE DRAWINGS

The invention will be explained in more detail in conjunction with the appended drawings, wherein:

FIG. 2 is a block diagram showing the construction of a trailing ATM cell in the conventional mobile communication system;

FIG. 4 is a block diagram showing the construction of a leading ATM cell of the conventional mobile communication system;

FIG. 5 is a block diagram showing the construction of a mobile communication system according to a preferred embodiment of the invention;

DESCRIPTION OP THE PREFERRED EMBODIMENTS

Preferred embodiments of the invention will be explained in detail in conjunction with the accompanying drawings.

(1) Explanation of Construction

In data communication between a base station and a higher rank station in a mobile communication system, a transmission method is used wherein an existing leased line is used as a PM (physical media) sublayer and an ATM cell has been mapped in a leased line frame format.

As shown in FIG. 5, the mobile communication system according to a preferred embodiment of the invention generally comprises a base station A 1, a base station B 2, and a network 3.

The above construction will be explained in detail. The base station A 1 is connected to a higher rank station through a network 3. The network 3 and the base station A 1 are connected to each other through a leased line. An ATM cell 25 (see FIG. 6) for the base station A 1 and the base station B 2 is multiplexed in the trailing data from the higher rank station. The trailing ATM cell for the base station B 2 separated in the base station A 1 is sent from the base station A 1 to the base station B 2. The leading ATM cell sent from the base station B 2 is received in the base station A 1, is multiplexed in the leading ATM cell of the base station A 1, and is then sent to the higher rank station.

Figure 1:
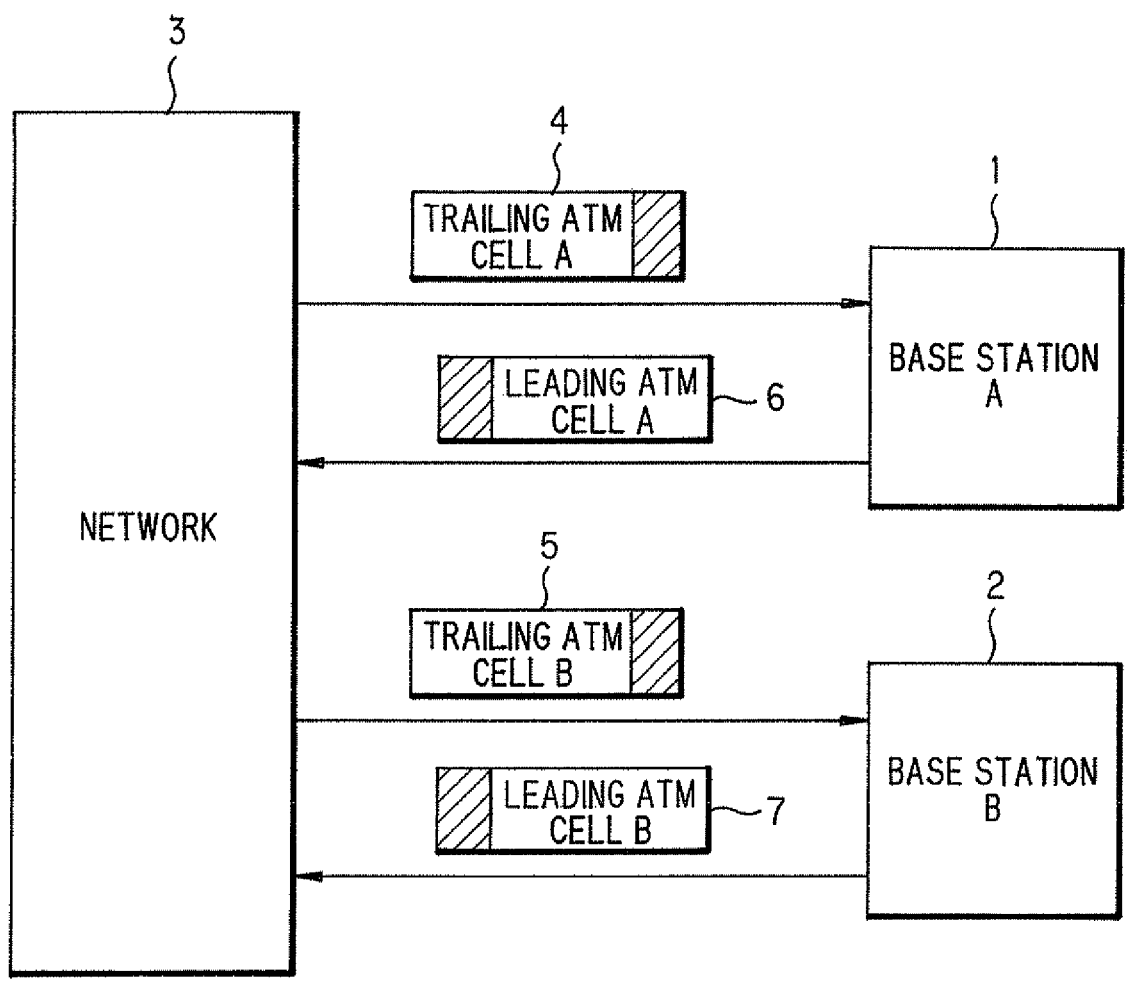
FIG. 1 is a block diagram showing an example of the construction of a conventional mobile communication system.
Figure 3:
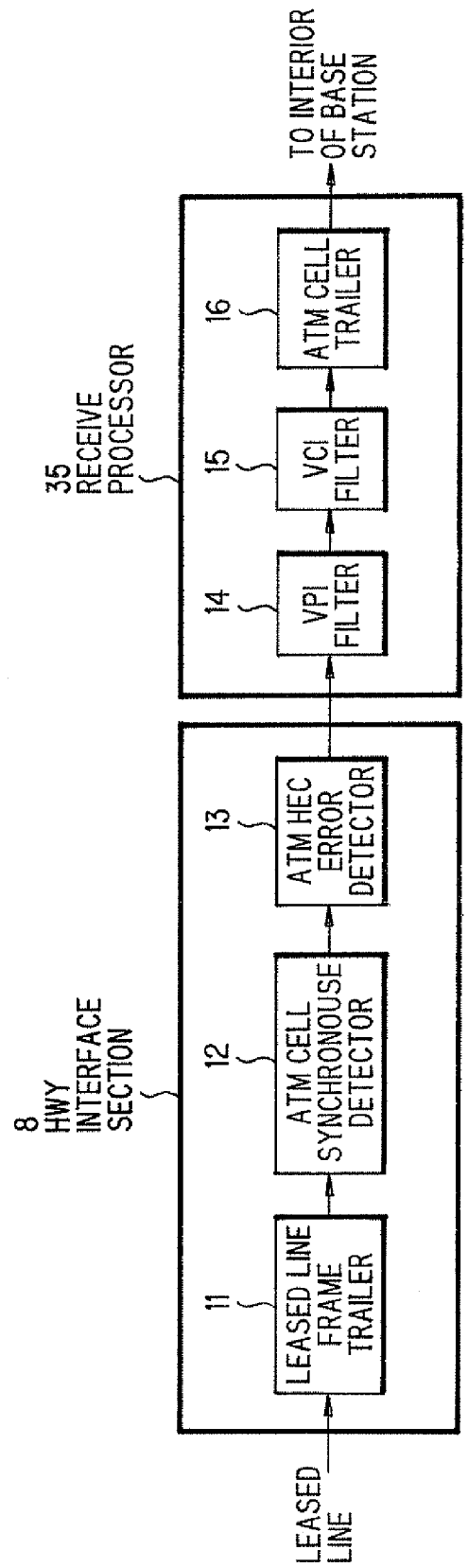
FIG. 3 is a block diagram showing the construction of a trailing processing function of the conventional mobile communication system.
Figure 6:
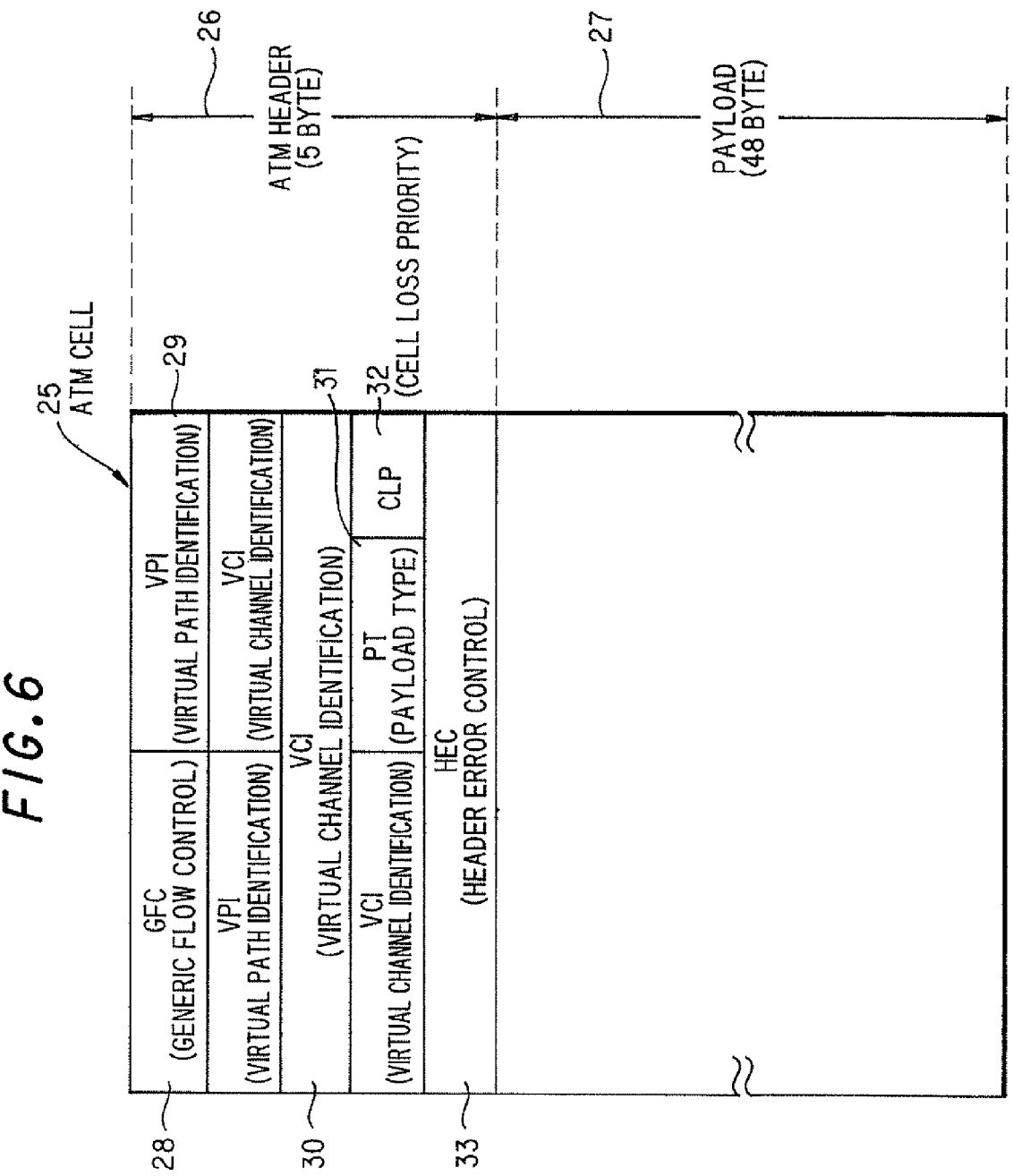
FIG. 6 is an explanatory view showing the construction of an ATM cell format according to a preferred embodiment of the invention.

FIG. 6 shows the ATM cell format. The ATM cell 2S is constituted by data of 53 bytes. 5 bytes from the head are accounted for by an ATM header 26, and the remaining 48 bytes constitute a payload 27. The ATM header 26 consists of GFC 28, VPI 29, VCI 30, PT 31, CLP 32, and HEC 33.

GFC 28 is provided for flow control which is performed when traffic has been increased and, consequently, overload state has taken place over the network 3. VPI 29 is utilized in setting of a virtual path between the higher rank station and the base station, and VCI 30 is utilized for the identification of each of a plurality of data in the set VP (virtual path) in the communication of the plurality of data. PT 31 indicates the state of cell (congestion), and CLP 32 indicates the significance of cell. HEC 33 functions to detect bit error of the ATM header 26, and indicates the results of coding of 8-bit CRC for 4 bytes in the header except for HEC 33. A payload 27 indicates the storage region of communication data.

Figure 7:
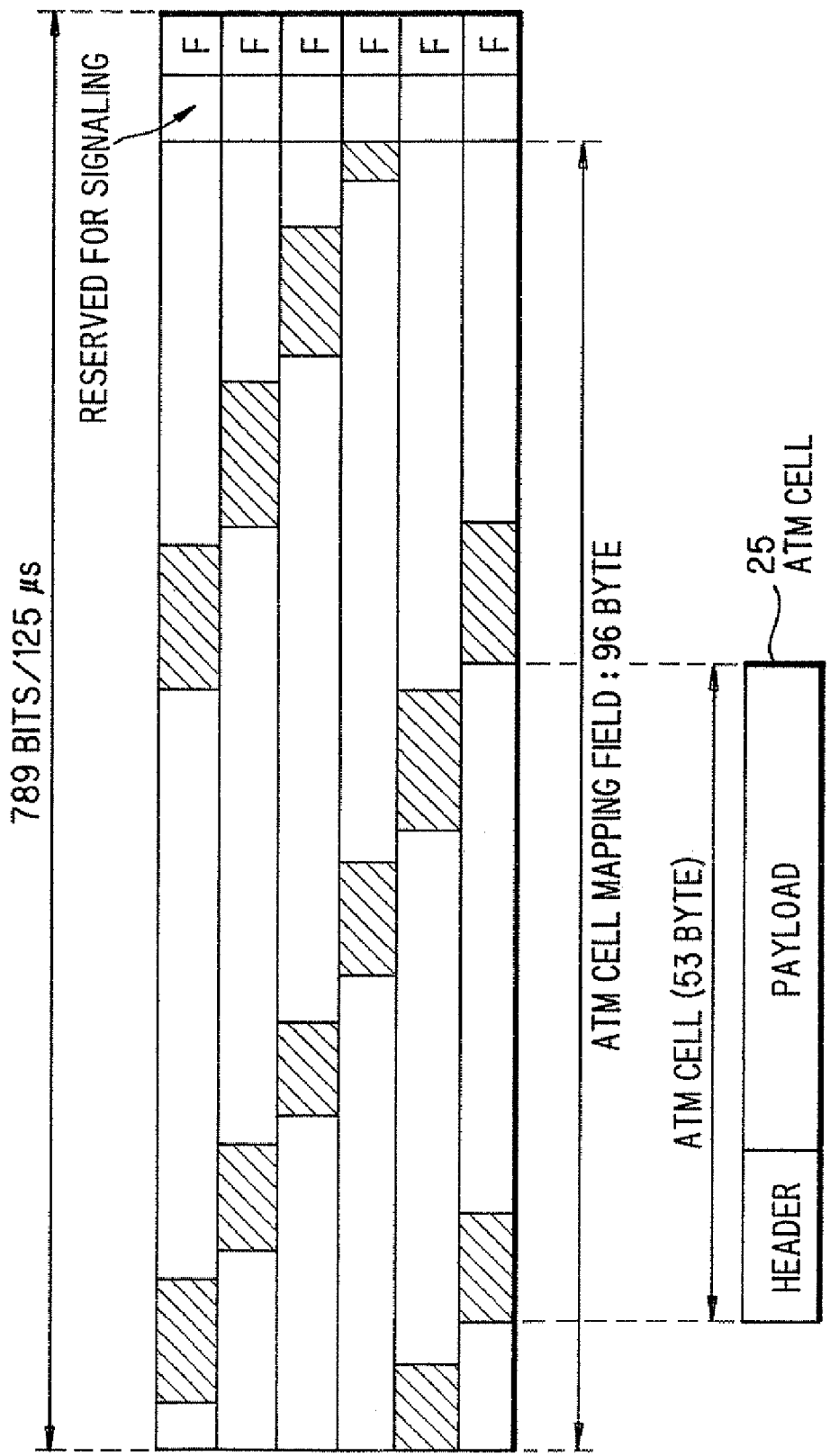
FIG. 7 is an explanatory view showing the construction of a leased line (secondary group) frame format according to a preferred embodiment of the invention.

FIG. 7 is a diagram showing a leased line (a secondary group) frame format as one example of the leased line frame format. The secondary group of leased lines have a transmission capacity of 6.3 Mbps wherein 789 bits are arranged in a frame of time length 125 μs. In this format, 8 bit-length 98 TSs (time slots) can be obtained. In a portion of 96 TSs (96 bytes×8=768 bits) among them, ATM cells 25 are continuously arranged.

Figure 8:
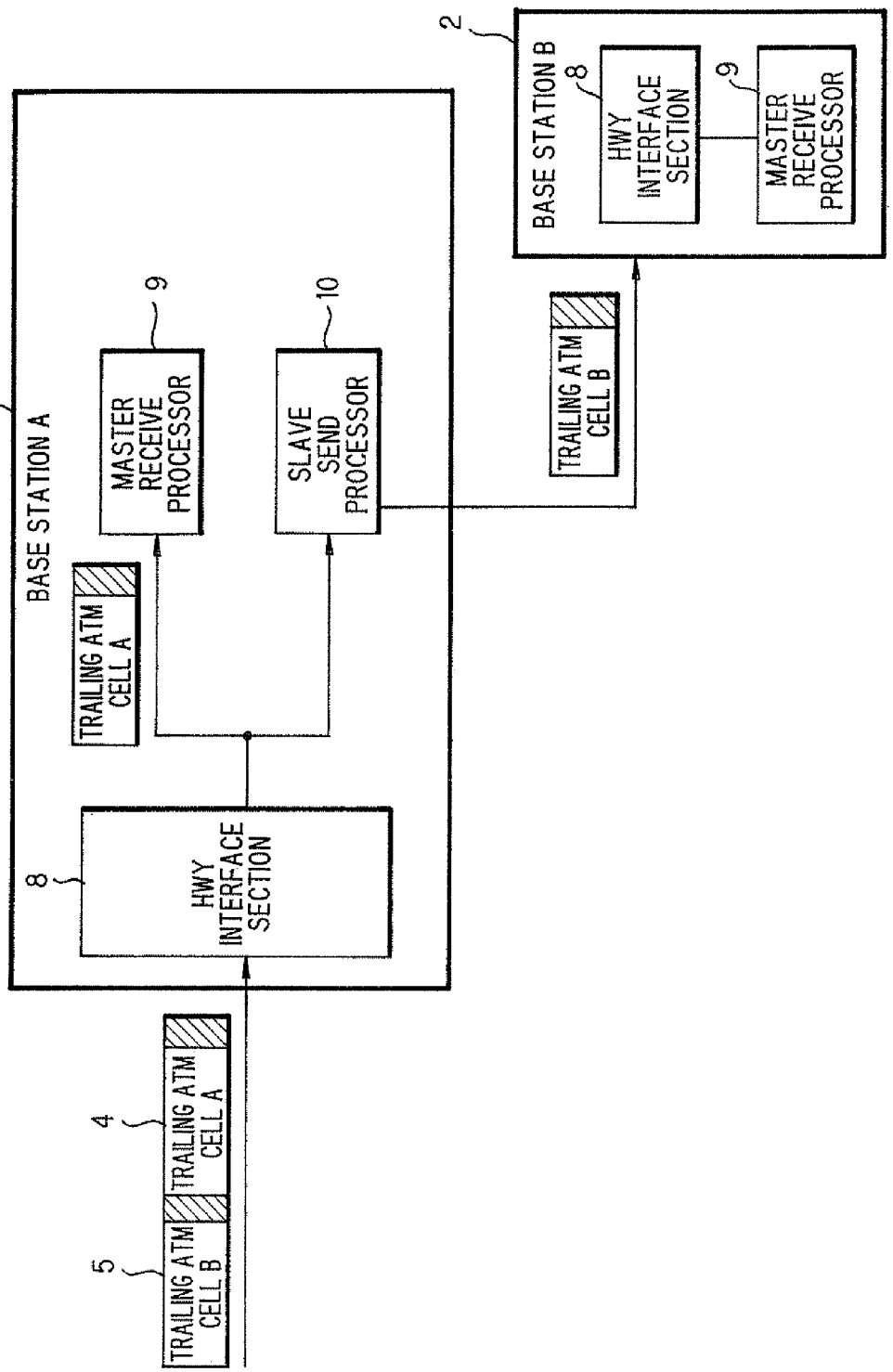
FIG. 8 is a block diagram showing the construction of a trailing ATM cell according to a preferred embodiment of the invention.

FIG. 8 shows the construction of a trailing ATM cell according to a preferred embodiment of the invention. The trailing ATM cell from the higher rank station is received in an HWY interface section 8 of the base station A 1. A master receive processor 9 terminates a trailing ATM cell A 4 addressed to the base station A 1 as the master. A slave send processor 10 identifies a trailing ATM cell B 5 addressed to the base station B 2, and sends the trailing ATM cell B 5 to the base station B 2. The base station B 2 has the same construction as the base station A 1, and, in order to receive the ATM cell 25 from the base station A 1, has the HWY interface section 8 and a master receive processor 9.

Figure 9:
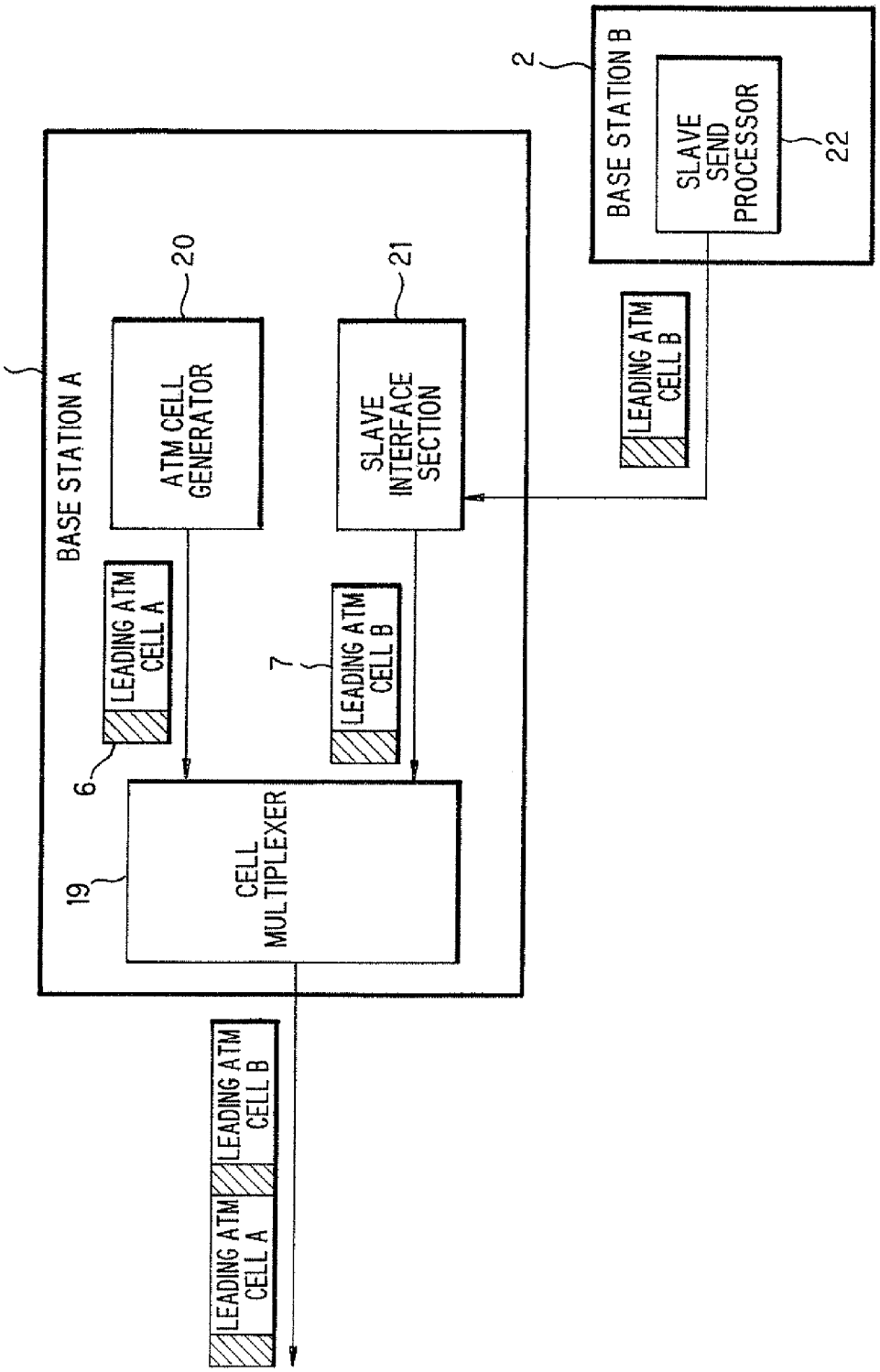
FIG. 9 is a block diagram showing the construction of a leading ATM cell according to a preferred embodiment of the invention.

FIG. 9 shows the construction of a leading ATM cell according to a preferred embodiment of the invention. A leading ATM cell A 6 from the base station. A 1 to the higher rank station is generated in an ATM cell generator 20, and a leading ATM cell B 7 in the base station B 2 is generated in the slave send processor 22. The base station A 1 receives the leading ATM cell B 7 from the base station B 2 in a slave interface section 21, multiplexes both the leading ATM cells 25 in a cell multiplexer 19, followed by the send of the multiplexed cells to a leased line.

Specifically, according to the base station connection method utilizing an ATM line according to a preferred embodiment of the invention, in a base station modulator/demodulator (base station) in a mobile communication system for data communication between a base station and a higher rank station by a transmission method wherein an ATM cell is mapped utilizing an existing leased line as a PM (physical media) sublayer, when the quantity of data utilized in one base station is much smaller than the band of the leased line connected due to a reduction in size/reduction in capacity of the base station, data of a plurality of base stations are multiplexed through an ATM layer in the leased line and the master base station functions to send data to the slave base station, to receive data from the slave base station, and to perform multiplex sending of the received data and the self-station data, whereby the effective utilization of the leased line is realized and the extension of the slave base station can be easily realized.

(2) Explanation of Operation

The operation of the preferred embodiment of the invention will be explained in detail in conjunction with FIGS. 6 to 11. As shown in FIG. 8, the construction of the trailing ATM cell according to the preferred embodiment of the invention is such that the trailing ATM cell from the higher rank station is received in the state of multiplexing of the ATM cell for the base station A 1 and the ATM cell for the base station B 2. Since the trailing ATM cell A 4 and the trailing ATM cell B 5 are mapped in the same leased line, in the case of VP connection wherein the cells are judged by path identification, the cells should be different from each other in VPI 29 in the ATM header 26 shown in FIG. 6.

The master receive processor 9 and the slave send processor 10 recognize VPI 29 set in the base station A 1 and the base station B 2.

Figure 10:
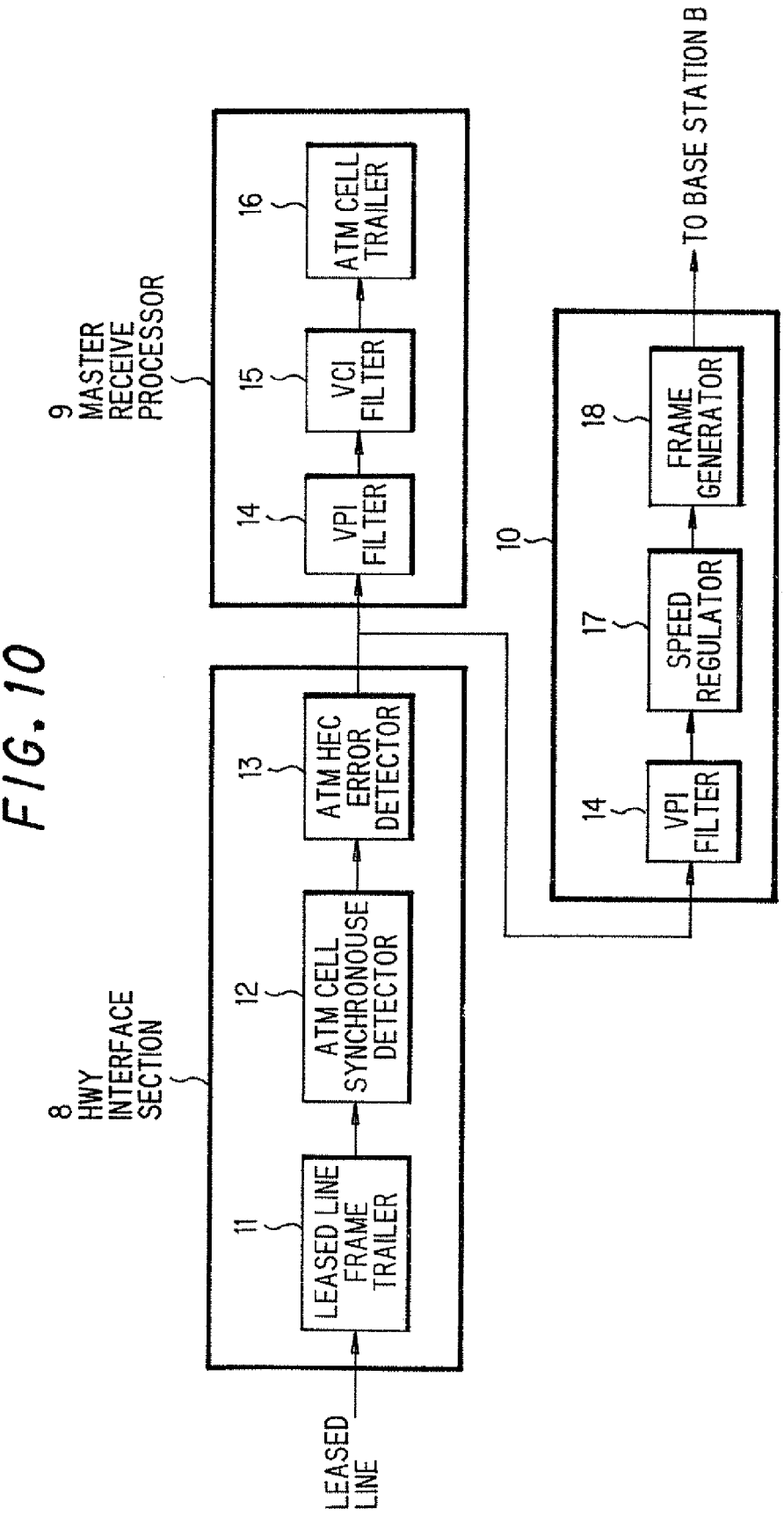
FIG. 10 is a block diagram showing the construction of a trailing processing function according to a preferred embodiment of the invention.

The construction of a trailing processing function according to the invention is as shown in FIG. 10. A leased line (secondary group) frame format as an example of the leased line frame format is shown in FIG. 7 described above.

The secondary group leased line has a transmission capacity of 6.3 Mbps wherein 789 bits are arranged in a frame of time length 125 μs. In this format, 98 TSs (time slots) of 8 bit-length can be obtained. In a portion of 96 TSs (96 bytes× 8=768 bits) among them, ATM cells 10 are continuously arranged. Since the length of the ATM cell 25 is 424 bits (53 bytes), as shown in the drawing, in some cases, the boundary of the 125 μs frame does not confirm to the cell boundary and, in this case, one ATM cell 25 extends over two frames. The specifications are in accordance with ITU-T (International Telecommunication Union-Telecommunication Standardization Sector) G. 804.

For the data received from the leased line, the physical layer is terminated in the HWY interface section 8. The trailing data received from the leased line is subjected to the synchronization of the frame format shown in FIG. 7 in the leased line frame terminal 8. Further, after the establishment of the frame synchronization, cell synchronization for establishing cell boundary position is carried out in an ATM cell synchronous detector 12 to identify the ATM cell 25 mapped within the frame format.

The ATM cell 25 within the frame format, which has been picked out in the ATM cell synchronous detector 12, is subjected to error detection of HEC 33 by an ATM HEC error detector 13, and ATM cell 25 having an error is discarded in this function. The trailing ATM cell in the physical layer judged to be effective is simultaneously sent to the master receive processor 9 and the slave send processor 10.

In the master receive processor 9, for the received trailing ATM cell, VPI 29 is confirmed by a VPI filter 14, and only the trailing ATM cell A 4 having VPI 29 assigned to the base station A 1 as the master is transferred to next processing. The trailing ATM cell B 5 having VPI 29 different from the set value is discarded by the present function. The trailing ATM cell A 4, which has been passed through the filter of VPI 14, judges various ATM cells 25 assigned by a VCI filter 15, followed by termination in an ATM cell terminator 16.

In the slave send processor 10, as with the master receive processor 9, the VPI filter 14 is used to judge only the trailing ATM cell B 5 assigned to the base station B. Since the trailing ATM cell B 5 has been sent from the higher rank station through the leased line in the state of multiplexing with the ATM cell A 4 of the base station A, behind the VPI filter 14, the band of the ATM cell B 5 is smaller than the band of the leased line. For this reason, a speed regulator 17 inserts an idol cell 34 instead of the ATM cell 25 discarded in the VPI filter 14.

The base station A 1 and the base station B 2 are connected to each other through a cable, and conversion to a leased line (secondary group) frame format is carried out in a frame generator 18 of a slave send processor 10. The base station B 2 has the same trailing processing function as the base station A 1, and the use of only the master receive processing can realize the termination of the trailing ATM cell B 5. Further, when the base station B 2 has the same trailing processing function as the base station A 1, the whole system can be constructed by an identical hardware. This can easily realize the provision of a base station C in the slave of the base station B 2.

Figure 11:
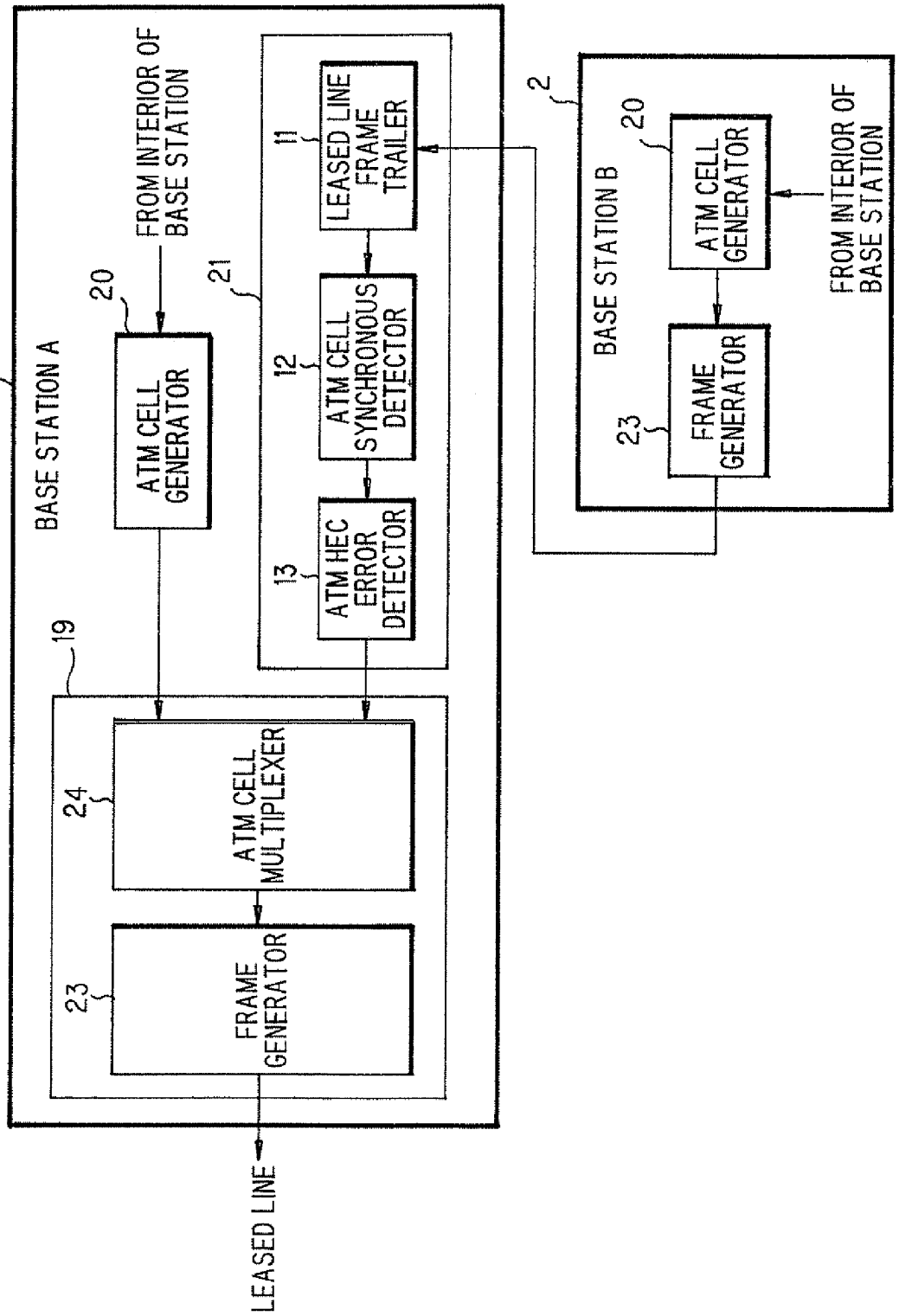
FIG. 11 is a block diagram showing the construction of a leading processing function according to a preferred embodiment of the invention.

FIG. 9 shows the construction of a leading ATM cell according to a preferred embodiment of the invention, and FIG. 11 shows the construction of a leading processing function according to a preferred embodiment of the invention.

The leading ATM cell B 7 from the base station B 2 is generated in the ATM cell generator 20. The base station B 2 is connected to the base station A 1 through a cable, and the base station B 2 uses a frame generator 23 of a cell multiplexer 19 to map the leading ATM cell B 7 in the leased line (secondary group) frame format shown in FIG. 7. The base station B 2 further has the function of mapping an idol cell 34 in the frame format according to the transmission rate capacity of the leading ATM cell B 7.

Regarding the leading signal from the base station B 2, the physical layer is terminated in the slave interface section 21 of the base station A 1. The slave interface section 21 functions in the same manner as the HWY interface section 8 which terminates the trailing physical layer. The leading ATM cell B 7 withdrawn in the slave interface section 21 is transferred to the cell multiplexer 19. Further, in the base station A 1, the ATM cell A 6 generated in the ATM cell generator 20 is transferred to the cell multiplexer 19. The cell multiplexer 19 comprises an ATM cell multiplexer 24 and a frame generator 23.

when the ATM cell A 6 and the ATM cell B 7 introduced respectively from the base station A 1 and the base station B 2 are sent to the leased line, the ATM cell multiplexer 24 controls the number of times of send. For each leased line used between the higher rank station and each base station, the band is previously determined. Therefore, the band is controlled by varying the number of times of send of each ATM cell according to the set value. The ATM cell 25 assigned in the ATM cell multiplexer 24 generates a frame format for a leased line in the frame generator 23.

The base station B 2 has the same leading processing function as the base station A 1, and the use of only the ATM cell generator 20 can realize the generation of the leading ATM cell B 7. Further, when the base station B 2 has the same leading processing function as the base station A 1, the whole system can be constructed by an identical hardware. This can easily realize the provision of a base station C in the slave of the base station B 2.

As described above, according to the preferred embodiment of the invention, for a base station wherein the usable band of the ATM cell between the base station and the higher rank station has been reduced due to a reduction in size/reduction in capacity of the base station, ATM cells of a plurality of base stations are logically multiplexed in a leased line between the base station and the higher rank station, the master base station terminates the ATM cell addressed thereto, and, at the same time, the send of ATM cell to a slave base station and the receive of ATM cell from the slave base station can be realized, whereby the waste of the leased line can be eliminated.

Since the master base station and the slave base station have the same processing function, the thinking of "master/slave base station" is unnecessary and, thus, this facilitates system design.

Further, since the master base station has the same processing function as the slave base station, a further slave base station can be easily provided under the slave base station.

Other Preferred Embodiments

In the above preferred embodiment, the higher rank station and the base station A are connected to each other through a leased line, and the master base station and the slave base station are connected to each other through a cable. In another preferred embodiment, a leased line may also be used for connection between the master base station and the slave base station. In this case, although only the secondary group (6.3 M) leased line is used in the above preferred embodiment, in another preferred embodiment, a more cost-effective system may be considered wherein, for the slave base station, conversion from the secondary group to the primary group is made.

Further, in the above preferred embodiment, an existing leased line is utilized. The same technique can also be applied to an SDH (synchronous digital hierarchy) system, for example, utilizing 155 M, and rate down from 155 M to the secondary group is possible.

The provision of a plurality of slave send functions within the base station permits the connection of the plurality of slave base stations under the master base station.

As is apparent from the foregoing description, the base station modulator/demodulator according to the invention performs the following control. Among ATM cells received through a leased line from a higher rank station, ATM cells addressed to a base station are terminated, and ATM cells addressed to another base station among the ATM cells received through the leased line front the higher rank station are sent to the another base station. Further, ATM cells of a plurality of base stations, a base station and other base station, are multiplexed, and the multiplexed cells are sent to the higher rank station through a leased line. In addition, the base station provided with the base station modulator/demodulator has the same processing function as other base station. The above construction can offer the following effects.

The first effect is such that, for a base station wherein the usable band of the ATM cell between the base station and the higher rank station has been reduced due to a reduction in size/reduction in capacity of the base station, ATM cells of a plurality of base stations are logically multiplexed in a leased line between the base station and the higher rank station, the master base station terminates the ATM cell addressed thereto, and, at the same time, the send of ATM cell to a slave base station and the receive of ATM cell from the slave base station can be realized, whereby the waste of the leased line can be eliminated.

The second effect is such that, since the master base station and the slave base station have the same processing function, the thinking of "master/slave base station" is unnecessary and, thus, this facilitates system design.

The third effect is such that, since the master base station has the same processing function as the slave base station, a further slave base station can be easily provided under the slave base station.

The invention has been described in detail with particular reference to preferred embodiments, but it will be understood that variations and modifications can be effected within the scope of the invention as set forth in the appended claims.

What is claimed is:

1. A base station in a mobile communication network, comprising:
    a receive component to receive, from a higher rank station in the network, a particular data unit that includes a plurality of data units multiplexed together as the particular data unit, a first portion of the particular data unit being destined for the base station and a second portion of the particular data unit being destined for another base station in the network;
    a first processor to:
        receive the particular data unit from the receive component,
        determine that the first portion of the particular data unit is destined for the base station and that the second portion of the particular data unit is not destined for the base station, and
        discard the second portion of the particular data unit; and
    a second processor to:
        receive the particular data unit from the receive component,
        determine that the second portion of the particular data unit is destined for the other base station and that the first portion of the particular data unit is not destined for the other base station, and
        send the second portion of the particular data unit, and not the first portion of the particular data unit, to the other base station.

2. The base station of claim 1, where the receive component simultaneously outputs the particular data unit to both the first processor and the second processor.

3. The base station of claim 1, where the second processor discards the first portion of the particular data unit and inserts idle data into the particular data unit to send with the second portion of the particular data unit before sending the second portion of the particular data unit with the idle data to the other base station.

4. The base station of claim 1, where the plurality of data units include ATM cells.

5. The base station of claim 1, where the second portion of the particular data unit is sent to the other base station in a leased line frame format.

6. The base station of claim 1, where the first processor determines that the first portion of the particular data unit is addressed to the base station based on a virtual path identifier that matches a value that is preset for the base station and that is present in header data of the particular data unit.

7. The base station of claim 6, where the second processor determines that the second portion of the particular data unit is addressed to the other base station based on a virtual path identifier that matches a value that is preset for the other base station and that is present in header data of the particular data unit.

8. The base station of claim 1, further comprising a send component to perform band control that includes multiplexing data units from the base station and the other base station in a proportion based on a predetermined band set value.

9. The base station of claim 1, where the base station and the other base station are functionally identical.

10. A method performed by a base station in a mobile communication network, the method comprising:
    receiving, from a higher rank station in the network, a particular data unit that includes a plurality of data units multiplexed together as the particular data unit, a first portion of the particular data unit being destined for the base station and a second portion of the particular data unit being destined for another base station in the network;
    sending the particular data unit to both a first processor and a second processor;
    determining, by the first processor, that the first portion of the particular data unit is destined for the base station and that the second portion of the particular data unit is not destined for the base station;
    determining, by the second processor, that the second portion of the particular data unit is destined for the other base station and that the first portion of the particular data unit is not destined for the other base station;
    identifying, by the first processor, the first portion of the particular data unit for processing by the base station; and
    sending, by the second processor, the second portion of the particular data unit to the other base station, without sending the first portion of the particular data unit to the other base station.

11. The method of claim 10, further comprising:
    discarding, by the first processor, the second portion of the particular data unit.

12. The method of claim 10, further comprising:
    discarding, by the second processor, the first portion of the first data unit.

13. The method of claim 10, further comprising:
    determining, by the second processor, whether a virtual path identifier in a header of the particular data unit has a value that is different from a value preset for the other base station; and
    discarding the first portion of the particular data unit when the virtual path identifier in the header of the particular data unit has the value that is different from the value preset for the other base station.

14. The method of claim 10, where the data units include ATM cells.

15. The method of claim 14, where the ATM cells are sent to the other base station and the higher ranking station in a leased line frame format.

16. The method of claim 10, further comprising:
    determining, by the first processor, whether a virtual path identifier in a header of the particular data unit has a value different from a value preset for the base station; and
    discarding the second portion of the particular data unit when the virtual path identifier in the header of the particular data unit has a value different from the value preset for the base station.

17. The method of claim 16, further comprising:
    inserting idle data, in place of the discarded second portion, into the particular data unit; and sending the second portion of the particular data unit with the idle data to the other base station.

18. The method of claim 10, further comprising:
performing band control to multiplex data units from the base station and the other base station in a proportion based on a predetermined band set value.

19. The method of claim 10, where the base station has the same processing functions as the other base station.

20. A base station in a mobile communication network, comprising:
means for receiving, from a higher rank station in the network, a particular data unit that includes a plurality of data units multiplexed together as the particular data unit;
means for determining that a first portion of the particular data unit is destined for the base station when a first virtual path identifier in a first header of the particular data unit has a first value that matches a value preset for the base station, and that a second portion of the particular data unit is not destined for the base station when a second virtual path identifier in a second header of the particular data unit has a second value that does not match the value preset for the base station;
means for determining that the second portion of the particular data unit is destined for another base station when the second virtual path identifier in the second header of the particular data unit has the second value that matches a value preset for the other base station, and that the first portion of the particular data unit is not destined for the other base station when the first virtual path identifier in the first header of the particular data unit has the first value that does not match the value preset for the other base station;
means for processing the first portion of the particular data unit; and
means for sending the second portion of the particular data unit to the other base station, without sending the first portion of the particular data unit to the other base station.

* * * * *